United States Patent [19]

Roberts

[11] Patent Number: 5,330,788
[45] Date of Patent: Jul. 19, 1994

[54] TEMPORARY COATING SYSTEM

[75] Inventor: Wilbert J. Roberts, Plymouth, Mich.

[73] Assignee: Henkel Corporation, Plymouth Meeting, Pa.

[21] Appl. No.: 927,769

[22] Filed: Aug. 10, 1992

[51] Int. Cl.$^5$ ............................................. B65B 33/00
[52] U.S. Cl. ...................................... 427/154; 134/38; 252/544; 252/546; 524/556
[58] Field of Search .................. 134/38; 252/544, 546; 427/154, 156; 524/556

[56] References Cited

U.S. PATENT DOCUMENTS

| | | | |
|---|---|---|---|
| 4,168,255 | 9/1979 | Lewis et al. | 427/388.4 X |
| 5,006,279 | 4/1991 | Grobbel et al. | 252/166 X |
| 5,017,303 | 5/1991 | Komatsu et al. | 134/38 X |
| 5,102,573 | 4/1992 | Han et al. | 134/38 X |

OTHER PUBLICATIONS

Monsanto Material Safety Data Nov. 25, 1985.
Polymers, Resins and Monomers: Rohm and Haas Company 1985.
Material Safety Data Sheet Aug. 1, 1990.
Surfnol ® 400 Series Surfactants: Air Products no date shown.
Provisional Technical Data: Allied Signal Feb. 1990.
Technical Data Sheet: B. J. Goodrich no date shown.
Technical Bulletins: DeForest Enterprises, Inc. Oct. 1987.
Material Safety Data Sheets: DeForest Enterprises, Inc. Apr. 17, 1992.
Packing Slip: DeForest Enterprises, Inc. Jul. 1, 1992.
Letter of May 6, 1992 from DeForest Enterprises, Inc.
Brochure: "Reactions of Alkyl Alkanolamines" no date shown.
Charts: Alkyl Alkanolamines (2 pages) no date shown.

*Primary Examiner*—Michael Lusignan
*Attorney, Agent, or Firm*—Ernest G. Szoke; Wayne C. Jaeschke; Daniel S. Ortiz

[57] ABSTRACT

The invention is a composition for providing a temporary coating to protect the surface of an article and a solvent free composition for rapidly removing the coating from the article. The invention also includes a method for protecting a surface of an article and a system for carrying out the process.

31 Claims, No Drawings

TEMPORARY COATING SYSTEM

FIELD OF THE INVENTION

The invention is a composition, a system and a method for protecting the surface of articles which are stored out-of-doors or transported in open transport vehicles. The composition can also be used to provide a coating which can be readily removed to remove graffiti from a surface.

BACKGROUND OF THE INVENTION

Articles, particularly metal articles, with smooth shiny surfaces or finishes are often stored out-of-doors or transported in open transport vehicles. If the appearance and particularly a smooth shiny finish is important, it is desirable and often necessary to protect the surface of the article from environmental damage. Environmental damage can be caused by factors such as salt spray, acid rain, industrial fallout, animal excretions, particularly bird droppings, insect tracks, wind blown abrasive dust and debris, iron particles from rail cars, and the like.

Finished articles, such as automobile panels, assembled automobiles and trucks, aircraft subassemblies, large heavy industrial machinery, aircraft turbine parts and the like, whether painted or unpainted, have finishes which require protection from environmental damage when they are stored out-of-doors or transported in open transport vehicles.

The need for protection from environmental damage is particularly acute in relation to automotive finishes and aircraft subassemblies. Automobiles are generally assembled at a central location then transported in open vehicles or rail flatbed cars and stored out-of-doors until sold. At times, the out-of-doors storage period can extend for several months.

Current automotive finishes generally comprise a clear top coat which imparts a high gloss and color depth perception to the finish. The high gloss clear coat is subject to environmental damage which must be repaired before the automobile is acceptable to a purchaser. The repair of the environmental damage to automobile finishes is a large expense to the automobile manufacturer amounting to millions of dollars each year.

There is a need for a protective coating which can be applied quickly with little effort, is resistant to environmental damage and can be removed easily after weathering for an extended period.

RELATED ART

At present, wax based temporary coating materials are commercially available. The wax based materials can be applied to a metal or painted surface and can withstand environmental attack. However, wax based coatings are difficult to remove usually requiring heat and/or solvents for removal. Heat and solvents can be damaging to a painted surface.

Certain acrylic polymers and copolymers have been used as temporary coatings for automotive finishings. The acrylic polymers are formulated with surfactants such as alkali metal salts of phosphate esters, nonionic surfactants, chlorinated surfactants, emulsifiers, rust inhibiting agents, defoaming agents and the like. A temporary protective acrylic coating can be readily applied to the surface to be protected. The coating can be removed from the surface by application of highly alkaline aqueous solutions. However, on exposure and weathering, the known acrylic coatings become more difficult to remove by application of an alkaline solution alone, and rubbing and in some cases buffing with an abrasive material is required. The rubbing and buffing is labor intensive, expensive, and in addition removes some of the finish.

There is a need for a temporary coating material which is easy to apply, can withstand weathering for extended periods, is resistant to environmental damage, is not harmful to a painted finish or metal surface and can be rapidly removed from the surface by means which do not damage the metal surface or a painted finish.

BRIEF SUMMARY OF THE INVENTION

According to the present invention, a temporary coating which is easy to apply and can be removed quickly by contact with a mildly alkaline material after weathering, is provided. The temporary coating comprises acrylic polymer or copolymer, a hydroxylated or ethoxylated acetylenically unsaturated nonionic surfactant, optionally a neutralized phosphate ester surfactant and water. The composition can additionally comprise rust inhibitors, colorants, viscosity control agents, biocides, plastisizers and other agents which are known to be incorporated into acrylic polymeric or copolymeric coating compositions.

The invention also includes a mildly alkaline, caustic free stripping solution. The alkaline stripping solution comprises a dialkylaminoalkanol, an alkanolamine or ammonia, a chelating agent, a nonionic surfactant, an anionic surfactant, and water. The stripping solution can also include defoaming agents, rust inhibitors, or other additives for protecting metal surface.

The invention also includes a temporary coating system comprising the acrylic polymer temporary coating composition and the caustic free stripping solution for rapid removal of the temporary coating without rubbing or buffing.

The temporary coating can be applied by any means for applying an aqueous dispersion to the surface of the article to be protected, then air drying or baking the coated article. The coating is weather and rain resistent and can be rapidly removed by contact with an aqueous stripping solution without rubbing or buffing. The temporary coating can be removed by contact with a stripping solution in less than about two (2) minutes and preferably in one (1) minute or less. The easy application and rapid removal of the temporary coating makes the system commercially desirable.

DETAILED DESCRIPTION OF THE INVENTION

The temporary coating composition comprises a film forming acrylic polymer or copolymer and an acetylenically unsaturated nonionic surfactant. The nonionic surfactant comprises an acetylenically unsaturated hydroxylated or ethoxylated surfactant.

The film forming acrylic polymer comprises an aqueous dispersion of a film forming acrylic polymer or copolymer. The acrylic polymer can be a polymer or copolymer of acrylic acid, or an acrylate. If a copolymer is used it is preferably a copolymer with an ethylenically unsaturated material such as ethylene, styrene or other ethylenically unsaturated monomer. Preferably the acrylic polymer is a partially neutralized acrylic acid polymer, copolymer or mixtures thereof. The preferred acrylic acid polymer dispersion or copolymer dispersion can comprise a partially neutralized or reacted divalent metal salt of an acrylic acid polymer or copolymer, a partially neutralized or reacted divalent metal salt of a mixture of acrylic acid polymers and acrylic acid copolymers or a partial divalent metal salt of a mixture of acrylic acid copolymers. Divalent cations such as calcium and zinc can be used with zinc preferred.

The acrylic acid polymer dispersions can also be neutralized with other basic materials such as alkanol amines, alkylaminoalkanols, alkylamines, ammonia and the like. Commercial aqueous acrylic acid polymer dispersions such as ACqua ® from Allied Signal Corporation which comprises an aqueous dispersion of alkyl alkanolamine and a zinc salt or calcium salt of ethylene-acrylic acid copolymer has been found to be useful in the present invention.

Acrylic acid polymeric dispersions such as CARBOSET ® XPD-1214 have also been found to useful in the temporary coating composition of the present invention. Acrylic acid copolymers with other vinyl monomers such as propylene, butylene, styrene or other known monomers which provide polymeric film forming materials can also be used in the practice of the present invention.

The acrylic acid polymers and copolymers can be neutralized by caustic soda, caustic potash, ammonia, amines, alkanolamines or alkyl alkanolamines and alkaline and divalent metal compositions. The neutralizing agent is dependent upon the type polymer utilized, the properties required for the application and the flexibility of the required film.

A second critical component of the temporary coating composition is an acetylenically unsaturated nonionic surfactant. A preferred nonionic surfactant comprises a hydroxylated or ethoxylated acetylenically unsaturated hydrophobic moiety. The preferred surfactant comprise two hydrophobic groups connected with an acetylenic linkage, having hydroxy or ethoxy groups pendant near the acetylenic linkage. Each hydrophobic group connected with the acetylenic linkage can contain from 4 to about 10 carbon atoms.

SURFYNOL ® brand surfactants, products of Air Products and Chemical Company, have been found useful in the practice of the present invention. Test results show that the combination of the acetylenically unsaturated surfactant with the acrylic polymer or copolymer provides for the excellent weatherability and easy removal of the temporary coating.

The coating composition of the present invention preferably also contains an anionic phosphate ester surfactant. Phosphate ester surfactants are well known in the art. Anionic phosphate ester surfactants generally comprise a hydrophobic moiety or an ethoxylated or ethoxylated and propoxylated hydrophobic moiety, esterified with phosphoric acid. The preferred surfactants are anionic phosphate esters of natural or synthetic fatty alcohols or ethoxylated fatty alcohols.

The phosphate ester surfactants are generally mixtures of mono- and di- esters, but mono- or di-esters alone are useful. A complex mixture of esters is also useful. The coating composition of the present invention is an alkaline material and the acidic portions of the phosphate esters are generally neutralized with an alkali metal, ammonia or an organic base such as amine, alkanolamine, alkyl alkanolamine and the like.

The organic ester moiety of the phosphate esther can be an aliphatic or aromatic moiety and can be modified with ethoxy or propoxy groups. Phosphate ester surfactants such as DePHOS ® PE 786, DePHOS ® HP-739, DePHOS ® P6LF-AS and DePHOS ® RA70, products of DeForest Enterprises Inc. have been found useful. However, similar phosphate ester surfactants are manufactured by other companies and can be used in the practice of the present invention.

The anionic phosphate ester surfactants are preferably mono- or di- esters or mixtures of mono- and di- esters of fatty alcohols or ethoxylated fatty alcohols. The ester groups comprise residues of fatty alcohols having from about 7 to about 18 carbon atoms.

The pH of the coating composition is generally adjusted to a pH in the range of 7 to about 10.5, preferably in the range of 8 to 9.5, by the addition of basic materials such as ammonia, alkylamines, alkanolamines, alkyl alkanolamines, alkali metal hydroxides and the like. The preferred neutralizing agents are dialkylaminoalkanols or mixtures of dialkylaminoalkanols with alkanolamines amines, ammonia or alkali metal hydroxides. Amines such as dimethylethanolamine, diethylethanolamine, diethylpropanolamine, 2-amino-2-methyl-1-propanol, 2-dimethylamino-2-methyl-1-propanol, and the like have been found useful for use as at least a portion of the neutralizing agents in the formulation of the coating composition of the present invention.

The amount of neutralizing agent required in the formulation is dependent upon the amount of the acrylic acid moieties which have been neutralized, reacted or esterified in the film forming acrylic polymer or copolymer dispersion which is used in preparing the formulation.

The acid groups on the phosphate ester surfactant can be neutralized with an alkali metal hydroxide, carbonate or bicarbonate, such as sodium hydroxide, potassium hydroxide, sodium carbonate, potassium carbonate, and the like. The acid groups on the phosphate ester surfactant can also be neutralized with ammonia, amines, alkanol amines, alkylalkanolamines and other neutralizing materials which are known in the art. It has been found useful to utilize an alkyl alkanolamine material to at least partially neutralize a coating composition to bring the pH in the range 7 to about 10.5 and preferably about 8 to about 9.

The coating composition of the invention can also include optional adjuvants such as corrosion inhibitors, anti-foam agents, colorants, biocides, thickeners and the like which can improve film forming characteristics or storage properties of the coating composition. These additional adjuvants are not critical to the function of the coating composition but they aid in improving their commercial utility of the coating in that they can be made easier to apply or handle, can be packaged more easily or are more resistant to biological attack.

The coating composition of the present invention preferably comprises:

| COMPONENT | % BY WEIGHT |
| --- | --- |
| Acrylic polymer or copolymer | 3-25 |
| Phosphate Ester Surfactant | 0-10 |
| Nonionic acetylenically unsaturated surfactant | 0.1-5 |
| Neutralizing Agent | 0.5-10 |
| Water | balance |

The neutralizing agent is included in the composition to provide a pH in the range of 7–10.5 and preferably a pH in the range of 8–9. The amount of neutralizing agent shown is in addition to the amount of neutralizing agent required to partially neutralize or react with the film forming polymer and any anionic surfactant in the formulation. In addition to the ingredients included in the above formulation, the formulation can contain optional ingredients such as foam inhibitors, corrosion inhibitors, colorants, biocides, thickeners and other materials which are generally used in aqueous compositions to provide desired physical properties to the composition.

A more preferred coating composition comprises:

| COMPONENT | % BY WEIGHT |
|---|---|
| Acrylic acid polymer or copolymer | 7–20 |
| Phosphate Ester Surfactant | 0.5–5 |
| Acetylenically Unsaturated Surfactant | 0.2–3 |
| Dialkylalkanolamine | 2–5 |
| Water | balance |

In an independently preferred embodiment, the film forming acrylic polymer material comprises a mixture of two different partially neutralized acrylic acid copolymers; more preferably one of the copolymers is a copolymer of ethylene and acrylic acid which has been partially reacted or neutralized with a zinc complex. Utilizing a combination of two different acrylic polymer materials, provides a coating which has advantageous properties over those which are obtained from a single polymer material.

The coatings formed from the coating composition of the present invention provide a coating which is rapidly removable by contact with an alkaline aqueous medium. The coating can be rapidly removed even after weathering or exposure to the elements for extended periods. Generally, temporary coatings known in the art become more difficult to remove after a period of weathering. As distinguished from the prior art coatings, the temporary coatings of the present invention can be rapidly removed even after weathering for several months.

The temporary coating of the present invention is a clear coating which can be coated over glass without obscuring the view through the glass surface. This is particularly important in protecting the surface of automotive finishes in that the automobile can be driven, without obscuring the vision of the driver, immediately after the coating has been applied to the auto body and the glass surfaces.

The temporary coating of the present invention can be removed by contact with an alkaline material. Alkaline compositions such as aqueous solution of ammonium hydroxide, trisodium phosphate, sodium carbonate, sodium metasilicate, and the like are useful for removing the temporary coating of the present invention. These alkaline cleaners, however, usually require more than one or two minutes of contact between the aqueous alkaline cleaner and the temporary coating to cause the coating to wrinkle and lift from the surface so as to be easily flushed from the surface. These alkaline cleaners tend to degrade metal surfaces (aluminum) and high gloss paint finishes.

It has been discovered that a particularly effective stripping or removing composition comprises a dialkylaminoalkanol, a nonionic surfactant, a high molecular weight polyethylene glycol (200–4000 mole weight), a phosphate ester anionic surfactant and water. Optionally, the composition contains a defoaming agent corrosion inhibitor and a biocide. The defoaming agent is useful in packaging the material at the production plant and the biocide increases the storage life of the composition.

The nonionic surfactant preferably comprises an ethoxylated alkylphenol such as IGEPAL® CO-630 or its equivalent. The anionic surfactant is preferably a phosphate ester surfactant such as RHODAFAC® RE 610, DePHOS® PE-786 or their equivalents. These surfactants are mixed phosphate esters. The ester group comprises one or more fatty groups containing from about 6 to 18 carbon atoms, which can be ethoxylated or propoxylated or ethoxylated and propoxylated.

The chelating agents useful in the practice of the inventions are materials such as sodium citrate, ethylene diamine tetraacetic acid and its salts, nitrilotriacetic acid salts, and other chelating agents 1-hydroxyethylidene-1,1-diphonic acid and amino tri(methylene phosphonic acid) which are useful to chelate multivalent metals in aqueous systems. In use, the coating stripping solution has a pH in the range from about 9.0 to about 12.0 preferably a pH from about 9.5 to 10.5. A preferred stripping solution concentrate comprises:

| COMPONENT | % BY WEIGHT |
|---|---|
| Dialkylalkanolamine | 10–40 |
| Monoalkanolamine (primary) | 2.5–25 |
| Nonionic Surfactant | 0.5–10 |
| Chelating Agent | 0.5–10 |
| Polyethylene glycol, mole weight 200–4000 | 0.5–10 |
| Anionic Surfactant | 0.1–5.0 |
| Water | balance |

In a more preferred embodiment, the dialkylalkanolamine is diethylethanolamine or dimethyl ethanolamine. A preferred alkanolamine is ethanolamine. A preferred nonionic surfactant is a polyethoxy nonylphenol, more preferably having about 4 to about 20 ethoxy groups. Other nonionic surfactants such as alkylglycosides can be used in the practice of this invention. A more preferred polyglycol material is a polyethyleneglycol having a molecular weight of about 200 to 1,000. A preferred anionic surfactant is a complex mixture of mono- and di-phosphate esters such as RHODAFAC® RE 610 or DePHOS® PE 786.

The stripping solution can contain optional adjuvants such as defoaming agents, corrosion inhibitors, biocides, viscosity control agents and the like to improve the physical properties of the composition.

A more preferred stripping solution concentrate comprises:

| COMPONENT | % BY WEIGHT |
|---|---|
| Dialkylalkanolamine | 15–30 |
| Alkanolamine | 5–15 |
| Polyethoxyalkyphenol nonionic surfactant | 1–9 |
| Chelating Agent | 1–6 |
| Polyethylene glycol, mole wt. 200–1000 | 2–7 |
| Phosphate ester anionic surfactant | 0.3–2.5 |

In use, the stripping solution concentrate is diluted with water to a concentration in the range of from about 5% to about 20% and preferably from about 8% to about 15% by volume of the concentrate.

The temporary coating is contacted with the diluted stripping solution to rapidly remove the temporary coating. The pH of the diluted stripping solution is preferably in the range of about 8 to 11 and more preferably from about 8.5 to 10.5. This moderate pH solution will not degrade or attack aluminum or painted surfaces.

The temporary coating composition and the stripping solution provide a total system which provides a tough weather resistant temporary coating for a substrate and a stripping solution for rapidly removing the temporary coating from the coated substrate. The system of the present invention has definite advantages in that the coating is tough and weather resistant but can be readily removed in a short period of time when contacted with the stripping solution.

The temporary coating and the removal of the temporary coating were tested according to the following methods.

A coating composition was formulated and applied to test panels, to form a 0.2-0.6 mil thick film. Thirty centimeter by ten centimeter test panels were coated with the formulation by an airless spraying technique. The coated aluminum and coated painted panels were then dried overnight at room temperature. The panels were positioned on the roof of a laboratory building for a weathering test. Square ten centimeter panels were coated with the formulation by the airless spray method, dried overnight at ambient temperatures and placed in a weatherometer model QUV manufactured by Q Panel, Co., Cleveland, Ohio, for accelerated weathering testing.

After the overnight drying, the water resistance of the panels was tested by applying several drops of synthetic acid rain to the surface of the panels to visually observe the effect of the synthetic acid rain droplets on the temporary coating. The synthetic acid rain comprises a mixture of about 66% by weight sulfuric acid and about 34% by weight nitric acid diluted with water to a pH of 3.8.

The panels were also tested for insect fluid resistance by placing a few drops of a synthetic insect fluid comprising about 80% by weight formic acid, about 15% by weight tannic acid and about 5% by weight honey to test the panels. The synthetic rain test and the synthetic insect fluid are applied to the article first. If the coating does not resist the acid rain or synthetic insect fluid, no other tests are run.

Periodically, the test panels were removed from the weatherometer or from the roof of the laboratory building, and the removabliity of the coating evaluated by placing a few drops of a stripping solution on the surface of the panel and measuring the length of time for the coating to wrinkle sufficiently so that it could be flushed with a stream of water from the panel surface. The length of time of contact with the stripping solution until the coating was sufficiently wrinkled to be easily flushed from the surface is noted in the examples as the stripping time.

In practice, the stripping solution can be wiped on, rolled on, sprayed on, or applied by dipping or any other useful method for contacting a coated surface with a liquid stripping solution. The stripping solution rapidly binds with the temporary film to cause it to wrinkle and break up into pieces which can be readily flushed from the surface with a moving stream of water. However, the coating can also be removed from the surface of the article by merely dipping the article and removing the article from the solution. The action of the dipping and removing the article from the solution aids in removing the wrinkled and broken up coating from the surface of the substrate. The preferred method of applying is by wiping, flushing, spraying, or rolling the stripping solution onto the coated surface.

It is not necessary to use mechanical action other than the flushing action of a stream of water to remove the loosened coating from the substrate. A touch of the finger moves the softened coating. Previously known coatings and stripping solutions require continuous rubbing with a cloth or a sponge, saturated with the stripping solution, over a 5-10 minutes period before rinsing. Even this does not insure complete removal, and generally a second application of the stripping solution is required.

The following compositions shown in Tables 1, 2, 3 and 4 were prepared and utilized to coat metal and painted substrates. The water resistance and the weatherability and the removability of the coating were tested as described above.

A stripping solution concentrate was prepared as shown in Table A. A 10% by volume solution of the concentrate in water was prepared and applied to the coatings to determine the stripping time of the coatings.

TABLE A

| CONCENTRATE COMPONENT | % BY WEIGHT |
| --- | --- |
| Diethylaminoethanol | 24 |
| Monoethanolamine | 10 |
| IGEPAL ® CO-630 (100% by weight) | 7.0 |
| Sodium Citrate | 4.0 |
| PE 400 (polyethylene glycol mole weight 400) | 4.0 |
| Phosphate ester surfactant | 1.3 |
| Defoamer DEEPO-97-3 (100% by weight) | 0.01 |
| Water | balance |

The coating compositions and the stripping time are shown in Table 1. The coated panels were weathered in the weatherometer for 168 hours before testing.

TABLE 1

| | PERCENT BY WEIGHT | | | | | | | |
| --- | --- | --- | --- | --- | --- | --- | --- | --- |
| Component | Ex. 1 | Ex. 2 | Ex. 3 | Ex. 4 | Ex. 5 | Comp Ex. 1 | Comp Ex. 2 | Comp Ex. 3 |
| ACqua ® 220[1] | 39 | 39 | 39 | 39 | 39 | 39 | 39 | 39 |
| Potassium Salt of Phosphate Ester[4] | 0.9 | 0.9 | 0.9 | 0.9 | 0.9 | 0.9 | 0.9 | — |
| Surfynol 420[3] | 0.5 | — | — | — | — | — | — | — |
| Surfynol 440[3] | — | 0.5 | — | — | — | — | — | — |
| Surfynol 465[3] | — | — | 0.5 | — | — | — | — | — |
| Surfynol 485[3] | — | — | — | 0.5 | — | — | — | — |
| Surfynol 104E[3] | — | — | — | — | 0.5 | — | — | — |
| IGEPAL ® CO-630[2] | — | — | — | — | — | 0.5 | — | — |
| Water | Balance | Balance | Balance | Balance | Balance | Balance | Balance | Balance |

TABLE 1-continued

|  | PERCENT BY WEIGHT | | | | | | | |
|---|---|---|---|---|---|---|---|---|
| Component | Ex. 1 | Ex. 2 | Ex. 3 | Ex. 4 | Ex. 5 | Comp Ex. 1 | Comp Ex. 2 | Comp Ex. 3 |
| Stripping Time Seconds | 5-10 | 5-10 | 5-10 | 5-10 | 10-15 | 15-20 | 15-20 | 102 |
| pH | 8½-9 | 8½-9 | 8½-9 | 8½-9 | 8½-9 | 8½-9 | 8½-9 | 8½-9 |

(1)ACqua ™ 220 - an aqueous dispersion of alkylalkanol amine and zinc salt of ethylene-acrylic acid copolymer (22-28% non-volatile).
(2)IGEPAL ™ CO 630 - a Nonyl phenoxy poly (ethylenoxy) ethanol manufactured by Rhône-Poulenc.
(3)Surfynol ® - Surfynol ® 104E, a fifty percent solution of tetramethyl decynediol in ethylene glycol. Surfynol ® 420-485, an ethoxylated tetramethyl decynediol, a product of Air Products and Chemicals Inc. The numbers in the series indicate differing numbers of ethoxy groups.
(4)Potassium Salt of a Phosphate Ester - The potassium salt of DePHOS ® P-6LF-AS a complex phosphate ester free acid form.

The data in Table I clearly shows the advantageous properties of the temporary coating of the present invention and particularly in conjunction with the stripping solution of the invention. The coating on the panels of Comparative Examples 1 and 2 became more difficult to remove after the panels were weathered for an additional period.

The diluted concentrate solution was used and the strippability of the panels determined in the laboratory by placing a few drops of the stripping solution on the coating and measuring the seconds until the coating broke-up and wrinkled without rubbing. A soft touch with a finger uncovered the substrate. The loosened coating could be easily flushed away with water. The coating on larger automotive parts, such as auto hoods was evaluated by rubbing the coated part lightly with a cloth, saturated with the stripping solution, and measuring the time in seconds until the coating wrinkled or loosened to the point that it could be easily washed from the surface by a moving stream of water.

Laboratory and field evaluations have indicated that the system of the invention removes the protective coating within one to two minutes and in many in cases less than 15 seconds.

In the Examples shown in Table 2, the coated panels were air dried for twenty-four hours then checked for "synthetic acid rain" resistance by placing several drops of "synthetic acid rain" on the surface of the panel. After the water droplets had dried, the panel was checked to determine if a blistering or loosening of the coating from the surface had occurred and if the temporary coating remained clear. If no hazing, blistering or lifting occurred the water resistance of the panel was satisfactory. If blistering or lifting occurred, the water resistance of the panel was noted as unsatisfactory.

The effect of synthetic insect fluid on the temporary coating was also evaluated by placing a few drops of the synthetic insect fluid on the coating and observing the effect on the coating. If blistering or lifting occurred, the coating was not satisfactory. If the insect fluid penetrated the coating and affected the surface of the substrate or painted surface, the coating was not satisfactory.

The clarity of the film was visually determined and if the film remained clear it was noted as clear. An opaque spot where the water droplet remained is noted as opaque.

A stripping solution was prepared by diluting the concentrate shown above to a 10% v/v solution and used to strip the coating in the Examples shown in Table 2.

TABLE 2

| Component | PERCENT BY WEIGHT | | | | | | | | | | |
|---|---|---|---|---|---|---|---|---|---|---|---|
|  | Ex. 6 | Ex. 7 | Ex. 8 | Comp. Ex. 4 | Comp. Ex. 5 | Comp. Ex. 6 | Ex. 9 | Ex. 10 | Comp. Ex. 7 | Ex. 11 | Ex. 12 |
| ACqua(1) ® 220 | 5 | 8 | 8 | 8 | 5 | 5 | 8 | 8 | 5 | 5 | 8.0 |
| CARBOSET(2) EXP 1214 | 35 | 32 | 32 | 32 | 35 | 20 | 32 | 32 | 20 | 20 | 32.0 |
| DePHOS(3) HP 739 (Neutralized) | 1 | 1.0 | — | — | — | 2.0 | 2.0 | 1.0 | 1.0 | — | 2.0 |
| Surfynol(4) 420 | 0.5 | 0.5 | 0.5 | — | — | 0.5 | 0.5 | 0.5 | — | 0.5 | 0.5 |
| KOH | — | 0.8 | 0.1 | — | — | — | — | — | — | — | — |
| NH4OH | 1 | — | — | — | — | — | — | — | — | — | — |
| Diethylaminoethanol | — | — | — | — | — | 2.4 | 2.4 | — | 2.4 | 2.4 | — |
| Dimethylaminoethanol | — | — | — | — | — | — | — | — | — | — | 2.4 |
| Deionized Water | balance | balance | balance | balance | balance | balance | balance | balance | balance | balance | balance |
| pH | 9.02 | 8.3 | | 8.11 | 7.99 | 9 | | 9.2 | 10.02 | 10.53 | 9.67 |
| Acid Rain Resistance | Clear | clear | Clear | Clear | Clear | Clear | Clear | Clear | Clear | Clear | Clear |
| Insect Fluid Testing | Clear | Clear | Clear | Clear | Clear | Clear | Clear | Clear | Clear | Clear | Clear |
| Stripping Time in Seconds After: | | | | | | | | | | | |
| 1 Wk. Outdoor Weathering | 3-5 sec. | 10-15 | 3-5 | | 10-15 | Sticky Film | 3-5 | 3-5 | 15-20 | 15-20 | 3-5 |
| 2 Wks. Outdoor Weathering | 5-10 | 3-5 | 3-5 | 10-15 | 10-15 | | 10-15 | 5-10 | 15-20 | 15-20 | 10-15 |

(1)ACqua ® 220 A 22-28% by weight non-volatile content aqueous dispersion of alkyl alkanolamine and zinc salt of ethylene - acrylic acid copolymer Product of Allied Signal.
(2)CARBOSET XPD 1214 A 27.0% by weight solids of a thermoplastic acrylic copolymer, product of B. F. Goodrich Co.
(3)DePHOS ® HP 739 A complex phosphate ester, acid form product of DeForest Enterprises, Inc.
(4)Surfynol ® 420 Tetramethyldecynediol ethoxylated with 1.3 moles of ethylene oxide; a product of Air Products and Chemicals, Inc.

The sticky film in Comparative Example 6 was due to the high relative ratio between the amount of film forming polymer and surfactant in the formulation. The film removal time of Example 11 was high due to the small amount of surfactant in the formulation. When only the acetylenically unsaturated surfactant is present in the formulation, levels in the range of 0.5% or higher are required to provide for rapid removal of the temporary coating. The temporary coating of Comparative Example 7 became more difficult to remove as the panels were weathered for longer periods.

Table 3 and Table 4 show the stripping times for panels coated with the formulations of coatings shown. The stripping was carried out with a 10% v/v solution in water of the concentrate of Table A.

The phosphate ester anionic surfactants used in the examples in Table 3 and Table 4 were neutralized with potassium cations.

TABLE 3

| Component | PERCENT BY WEIGHT | | | | | | | | | | | | |
|---|---|---|---|---|---|---|---|---|---|---|---|---|---|
| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
| ACqua ® 550[1] | 8 | 8 | 8 | 8 | 8 | 8 | 8 | 8 | — | — | — | — | — |
| ACqua ® 220 | — | — | — | — | — | — | — | — | 10 | 8 | 8 | 8 | 8 |
| CARBOSET EXP 1214 | 32 | 32 | 32 | 32 | 32 | 32 | 32 | 32 | 30 | 32 | 32 | 32 | 32 |
| DePHOS ®[3] HP 739 | 1 | 1 | 1 | 1 | — | — | — | — | 1 | 1 | 1 | 1 | 1 |
| DePHOS ®[3] 75 LF | — | — | — | — | 1 | — | — | — | — | — | — | — | — |
| DePHOS ®[3] PE 786 | — | — | — | — | — | 1 | — | — | — | — | — | — | — |
| DePHOS ®[3] RA 531 | — | — | — | — | — | — | 1 | — | — | — | — | — | — |
| DePHOS ®[3] PL 6LF | — | — | — | — | — | — | — | 1 | — | — | — | — | — |
| Diethylamino-ethanol | 2.4 | — | 2.4 | — | 2.4 | 2.4 | 2.4 | 2.4 | 2.4 | 2.4 | 2.4 | 1.0 | 1.5 |
| Dimethylamino-ethanol | — | 2.4 | — | — | — | — | — | — | — | — | — | — | — |
| ATMP ® 95 | — | — | — | 2.4 | — | — | — | — | — | — | — | — | — |
| Water | balance | balance | balance | balance | balance | balance | balance | balance | balance | balance | balance | balance | balance |
| Surfynol 420 | 0.5 | 0.5 | — | 0.5 | 0.5 | 0.5 | 0.5 | 0.5 | 0.5 | 0.1 | 0.25 | 0.5 | 0.5 |
| Surfynol 440 | — | — | 0.5 | — | — | — | — | — | — | — | — | — | — |
| Stripping Time in Seconds After: | | | | | | | | | | | | | |
| 168 Hrs. Weathering | 3-5 | 3-5 | 3-5 | 3-5 | 3-5 | 3-5 | 3-5 | 3-5 | 5-10 | 3-5 | 3-5 | 3-5 | 3-5 |
| 3 Weeks Outdoor Weathering | 3-5 | 3-5 | 3-5 | 3-5 | 3-5 | 3-5 | 3-5 | 3-5 | 3-5 | 3-5 | 3-5 | 3-5 | 3-5 |

[1]ACqua ® 550 - a 22-28% non-volatile content aqueous dispersion of alkyl aklanolamine and calcium salt of an acrylic copolymer product of Allied-Signal.
[2]ATMP ® 95 - 93-97% by weight aqueous 2-amino-2-methyl-1-propanol product of Angus Chemical Co.
[3]DePHOS ® - Phosphate ester anionic surfactants products of DeForest Enterprises, Inc.

TABLE 4

| | PERCENT BY WEIGHT | | | | | | | | |
|---|---|---|---|---|---|---|---|---|---|
| | Ex. 26 | Ex. 27 | Ex. 38 | Ex. 29 | Ex. 30[1] | Comp. Ex. 8 | Comp. Ex. 9[2] | Comp. Ex. 10 | Comp. Ex. 11 |
| ACqua ® 220 | 20 | 20 | 20 | 20 | 20 | 40 | 37 | 39 | 40 |
| CARBOSET XPD 1214 | 20 | 20 | 20 | 20 | 20 | — | — | — | — |
| Potassium Salt of DeForest HP 739 | 1 | 1 | 1 | 1 | 1 | — | — | — | — |
| Diethylaminoethanol | 2 | 2 | 2 | 2 | 2 | — | — | — | — |
| Surfynol 104E | 1½ | 1½ | 1½ | 1½ | 2½ | — | — | — | — |
| Triton X-102 | — | — | — | — | — | ½ | 1.1 | ½ | 0.1 |
| Potassium Salt of DeForest PE 786 | | | | | | ¾ | 1½ | ½ | 1.0 |
| Acrysol ® TT-615 | ½ | 1 | 1½ | 2.0 | 1 | — | — | — | — |
| Water | balance | balance | balance | balance | balance | balance | balance | balance | balance |
| Stripping Time in Seconds After: | | | | | | | | | |
| 168 Hrs. Weatherometer | 3-5 | 3-5 | 3-5 | 3-5 | — | — | — | — | — |
| 4 Weeks Outdoor Weathering | 2-4 | 2-4 | 2-4 | 2-4 | — | 81 | 72.0 | 93 | 180 |

[1]Poor Coating - Not Tested
[2]Coating Washed Off in Rain
[3]ACRYSOL ® TT-615 - An alkali soluble acrylic polymer emulsion rheology modifier product of Rohm and Haas, Co.

A rheology modifier was included in the formulations shown in Examples 26-30. A rheology modifier can be useful to provide a coating which will cling to vertical surfaces.

The coating composition of the invention is also a corrosion inhibiting coating. Cleaned mild steel panels when coated with the temporary coating of the invention did not show any red rust on drying and after outdoor weathering in excess of a month. Cleaned aluminum panels when coated with the temporary coating of the invention did not show any white rust on drying and after outdoor weathering in excess of a month.

The temporary coating of the invention can be used to reduce the impact of graffiti on metal and painted structures. The coating is clear and can be used to coat vehicles which have windows such as railway cars and engines, subway cars and trucks. The coating can be rapidly stripped off the structure if it is necessary to remove any graffiti which has decorated the structure.

The temporary coating of the invention can also be used as a temporary coating which can be readily stripped off when it becomes dirty without the need for excessive mechanical brushing of the surfaces to be cleaned. This is particularly useful for large vehicles such as trucks and rail cars which can become coated with grease, tar, resins, diesel fuel exhaust and the like and require solvents and brushing to remove.

The temporary coating composition of the invention can be used to protect metal and painted structures which are not moveable to make graffiti easier to remove.

The temporary coating composition of the invention can be applied to surfaces such as mild or rolled steel, aluminum, stainless steel and the like without damaging the surface of the metal. In addition, the temporary coating composition of the present invention can be applied to painted surfaces to protect the painted surfaces from environmental damage.

The temporary coating of the present invention is clear, weather resistant, does not become more difficult to remove upon weathering or aging and in addition can be removed rapidly without the need for rubbing or buffing. The temporary coating of the present invention can be removed by applying the stripping solution by roller coating, brushing, dipping, spraying and the like followed by flushing with water to carry away the particles of the temporary coating from the surface of the article.

The coating composition of the present invention, can be applied and removed at temperatures from about 5° C. to about 55° C. and generally 10° C. to about 35° C. is satisfactorily and most preferably at room temperature. The coating is clear when applied to a glass surface so that vision is not obscured when driving a vehicle which has been coated with the temporary protective coating of the invention.

The coating composition can also be utilized to protect the surface of both, painted or metallized plastic or polymeric articles for which surface appearance is important. Painted or metallized surfaces of polymeric articles can be effectively protected from environmental damage by coating the article with a coating composition of the invention.

The stripping or coating removing composition of the present invention is particularly useful in that it does not contain any caustic or volatile solvents and can be utilized with a minimal impact on the environment. The stripping or coating removing composition of the invention can be used to remove the acrylic coatings which were used in the prior art for temporarily protecting the surface of articles.

I claim:

1. A weather resistant, rapidly removable, temporary coating composition which comprises:

(a) from about 3 to about 25% by weight of a film forming acrylic polymer, an acrylic copolymer or a mixture thereof;
   (b) from about 0.1 to about 5% by weight of a nonionic surfactant comprising a hydroxylated or ethoxylated acetylenically unsaturated hydrophobic moiety;
   (c) from 0 to about 10% by weight of an anionic phosphate ester surfactant;
   (d) from about 0.5 to about 10% by weight of a neutralizing agent, above the amount associated with the polymer and anionic surfactant; and
   (e) water.

2. A composition of claim 1 further comprising from about 0.1 to about 10% by weight of a phosphate ester anionic surfactant.

3. A composition of claim 2 comprising:
   (a) 7 to 20% by weight of the film forming acrylic polymer or copolymer;
   (b) 0.2 to 3% by weight of the acetylenically unsaturated nonionic surfactant;
   (c) 0.5 to 5% by weight of the phosphate ester anionic surfactant;
   (d) 2 to 5% by weight dialkylalkanol amine; and
   (e) water.

4. A composition of claim 1 wherein the acrylic polymer or copolymer comprises a copolymer comprising ethylene and acrylic acid residues which is partially reacted with a metal cation.

5. A composition of claim 1 wherein the nonionic surfactant comprises two alkyl moieties having from 4 to about 10 carbon atoms connected through an acetylenic linkage having at least one hydroxyl group or at least one ethoxy group appended to the carbon atom in each moiety adjacent the acetylenic linkage.

6. A composition of claim 2 wherein the nonionic surfactant comprises two alkyl moieties having from 4 to about 10 carbon atoms connected through an acetylenic linkage having at least one hydroxyl group or at least one ethoxy group appended to the carbon atom in each moiety adjacent the acetylenic linkage.

7. A composition of claim 1 wherein the pH of the composition is from about 7 to about 10.5.

8. A composition of claim 2 wherein the pH of the composition is from about 7 to about 10.5.

9. A composition of claim 2 wherein the ester groups of the ionic phosphate ester surfactant are independently selected from the group consisting of the residue of a fatty alcohol having from 7 to about 18 carbon atoms and the residue of an ethoxylated fatty alcohol having from 7 to about 18 carbon atoms and from about 1 to about 20 ethoxy groups.

10. A composition of claim 1 wherein the neutralizing agent comprises a dialkyl alkanolamine.

11. A composition of claim 10 wherein the neutralizing agent comprises diethyl ethanolamine.

12. A method for temporarily protecting the surface of unpainted or painted articles which comprises coating the surface of the article with a composition of claim 1.

13. A method for temporarily protecting the surface of an unpainted article or painted article which comprises coating the article with a composition of claim 2.

14. A method for temporarily protecting the surface of an unpainted article or painted article which comprises coating the article with a composition of claim 3.

15. A composition of claim 1 further comprising a rheology modifier.

16. A composition of claim 15 wherein the rheology modifier comprises an alkali swellable acrylic polymer.

17. A composition of claim 2 further comprising a rheology modifier.

18. A composition of claim 17 wherein the rheology modifier comprises an alkali swellable acrylic polymer.

19. A composition of claim 3 further comprising a rheology modifier.

20. A composition of claim 18, wherein the rheology modifier comprises an alkali swellable acrylic polymer.

21. A method for protecting a structure from permanent marring by graffiti which comprises coating the structures with the composition of claim 1.

22. A method for protecting a structure from permanent marring by graffiti which comprises coating the structure with the composition of claim 2.

23. A method for protecting a structure from permanent marring by graffiti which comprises coating the structures with the composition of claim 3.

24. A system for temporarily coating a surface of an article and rapidly removing the coating which comprises:
  (1) the coating composition of claim 1; and
  (2) a coating remover concentrate composition which comprises:
    (a) from about 5 to about 35% by weight of a dialkyl alkanolamine;
    (b) from about 2 to about 15% by weight of a primary monoalkanolamine;
    (c) from about 0.5 to about 15% by weight of a nonionic surfactant;
    (d) from about 0.1 to about 10% by weight of a chelating agent;
    (e) from about 0.5 to about 20% by weight of a polyethylene glycol with a mole weight of from about 200 to about 4,000;
    (f) from about 0.1 to about 10% by weight of an anionic surfactant; and
    (g) water wherein a sufficient amount of the coating composition is present to form a coating on the article, and a sufficient amount of the coating remover is present to remove the coating.

25. A system of claim 24 wherein the chelating agent is selected from the group consisting of alkali metal citrate, ammonium citrate, ethylenediaminetitraacetic acid and in its salts, nitriotriacetic acid and its salts, glucomic acid salts, hexstogluconate salts, 1-hydroxyethylidene-1, 1-diphosphonic acid and amino tri(methylene phosphonic acid).

26. A system for temporarily coating a surface of an article and for rapidly removing the coating which comprises:
  (1) the coating composition of claim 2; and
  (2) a coating remover concentrate composition which comprises:
    (a) from about 5 to about 35% by weight of a dialkyl alkanolamine;
    (b) from about 2 to about 15% by weight of a primary monoalkanolamine;
    (c) from about 0.5 to about 15% by weight of a nonionic surfactant;
    (d) from about 0.1 to about 10% by weight of a chelating agent;
    (e) from about 0.5 to about 20% by weight of a polyethylene glycol with a mol weight of from about 200 to about 4,000;
    (f) from about 0.1 to about 10% by weight of an anionic surfactant; and
    (g) water wherein a sufficient amount of the coating composition is present to form a coating on the article, and a sufficient amount of the coating remover is present to remove the coating.

27. A system of claim 26 wherein the chelating agent is selected from the group consisting of alkali metal citrate, ammonium citrate, ethylenediaminetitraacetic acid and its salts, nitrilotriacetic acid and its salts, gluconic acid salts, heptogluconate salts, 1-hydroxyethylidene-1, 1 diphosphonic acid, and amino tri(methylene phosphonic).

28. A coating remover composition which comprises
  (a) from about 5 to about 35% by weight of a dialkyl alkanolamine;
  (b) from about 2 to about 15% by weight of a primary monoalkanolamine;
  (c) from about ½ to about 15% by weight of a nonionic surfactant;
  (d) from about 0.1 to about 10% by weight of a chelating agent;
  (e) from about ½ to about 20% by weight of a polyethylene glycol with a mole weight of from about 200 to about 4,000;
  (f) from about 0.1 to about 10% by weight of an anionic surfactant; and
  (g) water.

29. A composition of claim 28 wherein the chelating agent is selected from the group consisting of an alkali metal citrate, ammonium citrate, ethylenediaminetetraacetic and its acid salts, nitrilotriacetic acid salts, gluconic acid salt, heptogluconate salt, 1-hydroxyethylidene-1,1-diphosphonic acid and amino tri(methylene phosphonic acid).

30. A composition of claim 28 where in the anionic surfactant is a phosphate ester surfactant.

31. A composition of claim 28 wherein the dialkyl alkanolamine is selected from the group consisting of diethyl ethanolamine and dimethyl ethanolamine.

* * * * *